(12) United States Patent
Coleman et al.

(10) Patent No.: US 9,509,651 B2
(45) Date of Patent: Nov. 29, 2016

(54) PRESENTATION OF MESSAGES IN MULTI-SECTIONED VIEWS

(71) Applicant: GOOGLE INC., Mountain View, CA (US)

(72) Inventors: Keith Jonathan Coleman, Palo Alto, CA (US); Douglas Alexander Aberdeen, Adliswil (CH); Paul Morrell McDonald, Danville, CA (US); Annie Chen, Thalwil (CH); Andrew Ward Moedinger, Canton of Zurich (CH); Klaus Martin Kretzschmar, Zurich (CH); Jason Briggs Cornwell, San Francisco, CA (US); Debra Joy Lauterbach, San Francisco, CA (US)

(73) Assignee: Google Inc., Mountain View, CA (US)

(*) Notice: Subject to any disclaimer, the term of this patent is extended or adjusted under 35 U.S.C. 154(b) by 85 days.

(21) Appl. No.: 14/444,864

(22) Filed: Jul. 28, 2014

(65) Prior Publication Data
US 2014/0337757 A1   Nov. 13, 2014

Related U.S. Application Data

(63) Continuation of application No. 13/165,767, filed on Jun. 21, 2011, now Pat. No. 8,793,591.

(51) Int. Cl.
| | |
|---|---|
| *G06F 3/00* | (2006.01) |
| *H04L 12/58* | (2006.01) |
| *G06F 3/0482* | (2013.01) |
| *G06F 3/0484* | (2013.01) |
| *G06Q 10/10* | (2012.01) |
| *G06F 3/01* | (2006.01) |

(52) U.S. Cl.
CPC ............ *H04L 51/22* (2013.01); *G06F 3/0482* (2013.01); *G06F 3/04842* (2013.01); *G06Q 10/107* (2013.01)

(58) Field of Classification Search
CPC .. G06Q 10/107; G06Q 10/10; G06Q 10/109; H04L 12/581; G06F 3/0482
See application file for complete search history.

(56) References Cited

U.S. PATENT DOCUMENTS

| | | |
|---|---|---|
| 7,010,616 B2 | 3/2006 | Carlson et al. |
| 7,174,368 B2 | 2/2007 | Ross, Jr. |
| 7,363,490 B2 | 4/2008 | Paulsen, Jr. et al. |
| 7,506,030 B2 | 3/2009 | Rouse et al. |
| 7,523,222 B2 | 4/2009 | Carlson et al. |
| 2005/0004989 A1 | 1/2005 | Satterfield et al. |
| 2005/0204001 A1 | 9/2005 | Stein et al. |

(Continued)

*Primary Examiner* — Nicholas Augustine
(74) *Attorney, Agent, or Firm* — Morgan, Lewis & Bockius LLP

(57) ABSTRACT

Systems and methods for presenting electronic messages are provided. In some implementations, a method includes, at a computing device having one or more processors and memory storing one or more programs for execution by the one or more processors, (A) causing to be concurrently displayed in an E-mail application (i) a first view of a message folder that includes one or more electronic messages and (ii) a user interface control indicating one or more alternate views are available for the message folder, wherein the user interface control persistently indicates the availability of the one or more alternative views and (B) hiding the user interface control, without user intervention, responsive to the occurrence of a predetermined system event.

15 Claims, 8 Drawing Sheets

(56) References Cited

U.S. PATENT DOCUMENTS

| | | |
|---|---|---|
| 2005/0262203 A1 | 11/2005 | Buchheit et al. |
| 2005/0267944 A1 | 12/2005 | Little, II |
| 2006/0031313 A1 | 2/2006 | Libbey, IV et al. |
| 2006/0031772 A1 | 2/2006 | Valeski |
| 2006/0075052 A1 | 4/2006 | Oostendorp |
| 2006/0168067 A1 | 7/2006 | Carlson et al. |
| 2009/0094340 A1 | 4/2009 | Gillai et al. |
| 2009/0292781 A1 | 11/2009 | Teng et al. |

PRESENTATION OF MESSAGES IN MULTI-SECTIONED VIEWS

TECHNICAL FIELD

This instant specification relates to presenting electronic messages.

BACKGROUND

As the popularity of email communication has grown, so too has the number of email messages received and stored in user accounts. A user account typically includes all the messages sent to and from a respective email address or user name, excluding messages deleted from the account. However, some user accounts may be associated with a plurality of email addresses or user names, sometimes called aliases, which together may be considered to be a single logical email address or user name. The amount of received email can quickly overwhelm users.

Additionally, many people now access and view their email on mobile devices, such as handheld computers or cell phones. Such mobile devices typically have small screens with even smaller message windows or interfaces for viewing messages. These interfaces often allow the user to view only a small number of messages at any given time, thereby requiring the user to interact more frequently with the interface to locate important messages, such as through scrolling through the messages.

SUMMARY

In one aspect, a computer-implemented method includes generating first instructions for presenting, on a computing device, a first view of an inbox that lists multiple electronic messages and for presenting a control, concurrently with the first view of the inbox, that indicates one or more alternate views available for the inbox. Each of the alternate views separate the electronic messages within the inbox into two or more concurrently displayed sections. The method further includes providing the first instructions to the computing device.

Implementations can include any, all, or none of the following features. The first instructions for the control further present individual controls for switching to each of the alternate views. The method further includes receiving, in response to a user selection of one of the individual controls, a request for one of the alternate views; generating, in response to receiving the request, second instructions for presenting the requested alternate view of the inbox including the two or more sections for the requested alternate view; and providing the second instructions to the computing device. The method further includes generating third instructions for presenting one of the alternate views of the inbox; and providing the third instructions to the computing device, wherein a threshold amount of time has elapsed since a last user selection of one of the individual controls, and wherein the third instructions no longer present the control that indicates the alternate views available for the inbox. The alternate views include two or more of a view having a section that includes read messages and a section that includes unread messages, a view having a section that includes starred messages and a section that includes non-starred messages, and one or more views each having a section that includes important messages and a section that includes non-important messages. Each entry in each alternate view represents a conversation that includes one or more messages, at least one of which satisfies one or more criteria for inclusion in a section of the alternate view. The first instructions for the control further present a close control, the method further includes generating, in response to a user selection of the close control, fourth instructions for presenting one of the alternate views of the inbox; and providing the fourth instructions to the computing device, wherein the fourth instructions no longer present the control that indicates the alternate views are available for the inbox.

In one aspect, a computer-readable medium storing instructions that when executed cause a computer to perform operations including presenting, on a computing device, a first view of an inbox that lists multiple electronic messages. The operations further include presenting, concurrently with the first view of the inbox, a control that indicates one or more alternate views are available for the inbox. Each of the alternate views separate the electronic messages within the inbox into two or more concurrently displayed sections.

Implementations can include any, all, or none of the following features. Presenting the control further includes presenting individual controls for switching to each of the alternate views. The operations further include receiving, in response to a user selection of one of the individual controls, a request for one of the alternate views; and presenting, in response to receiving the request, the requested alternate view of the inbox including the two or more sections for the requested alternate view. The operations further include presenting one of the alternate views of the inbox; and determining that a threshold amount of time has elapsed since a last user selection of one of the individual controls and, in response to determining that the threshold amount of time has elapsed, no longer presenting the control. The alternate views include two or more of a view having a section that includes read messages and a section that includes unread messages, a view having a section that includes starred messages and a section that includes non-starred messages, and one or more views each having a section that includes important messages and a section that includes non-important messages. Each entry in each alternate view represents a conversation that includes one or more messages, at least one of which satisfies one or more criteria for inclusion in a section of the alternate view.

In one aspect, a computer-implemented system includes a computer-readable medium that stores multiple electronic messages for an inbox. The system further includes an interface for receiving, from a computing device, a request for a first view of the inbox. The system further includes one or more processors that generate, in response to receiving the request, first instructions, which when processed by the computing device, present the first view of the inbox and present a control, concurrently with the first view of the inbox, that indicates one or more alternate views available for the inbox. Each of the alternate views separate the electronic messages within the inbox into two or more concurrently displayed sections. The one or more processors provide the first instructions to the computing device through the interface.

Implementations can include any, all, or none of the following features. The first instructions for the control, which when processed by the computing device, further present individual controls for switching to each of the alternate views. The interface receives, in response to a user selection of one of the individual controls, a request for one of the alternate views; wherein the one or more processors generate, in response to receiving the request, second instructions, which when processed by the computing device, present the requested alternate view of the inbox including the two or more sections for the requested alternate view; and wherein the one or more processors provide the second instructions to the computing device through the interface. The one or more processors generate third instructions, which when processed by the computing device, present one of the alternate views of the inbox; and wherein the one or more processors provide the third instructions to the computing device through the interface, wherein a threshold amount of time has elapsed since a last user selection of one of the individual controls, and wherein the third instructions no longer present the control that indicates the alternate views are available for the inbox. The third instructions, which when processed by the computing device, present a menu item that can be selected by a user to request that the control be presented again. The alternate views include two or more of a view having a section that includes read messages and a section that includes unread messages, a view having a section that includes starred messages and a section that includes non-starred messages, and one or more views each having a section that includes important messages and a section that includes non-important messages. Each entry in each alternate view represents a conversation that includes one or more messages, at least one of which satisfies one or more criteria for inclusion in a section of the alternate view.

The details of one or more implementations are set forth in the accompanying drawings and the description below. Other features and advantages will be apparent from the description and drawings, and from the claims.

DETAILED DESCRIPTION

In general, this document describes presenting user interface controls that allow a user to request that messages be displayed using one or more of multiple different message sorting types. The message sorting types sort the messages into multiple sections of a message inbox. For a particular message sorting type, the inbox sections of that message sorting type are displayed concurrently to the user.

These message sorting types can be referred to as alternate views for the message inbox. Each alternate view has one or more criteria that determine how the messages are divided into the inbox sections for that alternate view. For example, an alternate view can include a section for messages that the user has starred or marked as favorites, and another section for non-starred or all other messages. In another example, an alternate view can include a section for unread messages, and another section for messages that have been read by the user or marked as read.

Figure 1:
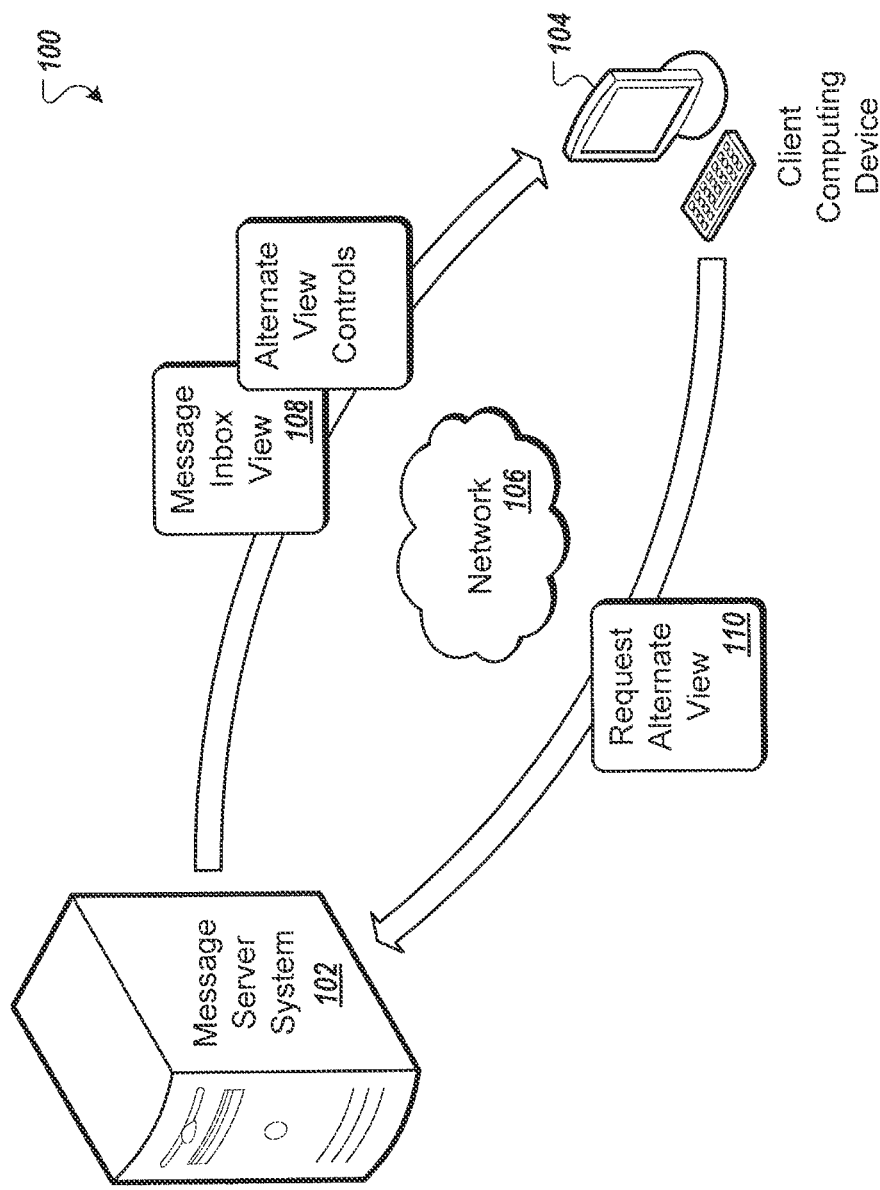
FIG. 1 is a schematic diagram that shows an example of a system for organizing a message inbox.

The systems and techniques described here may provide one or more of the following advantages. First, a system can provide an increase in usage of multi-sectioned message sorting types over a system that does not present user interface controls for selecting a multi-sectioned message sorting type. Second, a system can provide a reduction in an amount of time spent by a user in reviewing messages as a result of selecting one or more of the user interface controls for the multi-sectioned message sorting types. Third, a system can reduce display screen space consumed by the user interface controls for the multi-sectioned message sorting types by automatically hiding the user interface controls after a period of time elapses or in response to a request from the user FIG. 1 is a schematic diagram that shows an example of a system 100 for organizing a message inbox. The system 100 includes a message server system 102 that communicates with a client computing device 104 through a network 106. The message server system 102 sends one or more instructions 108 to the client computing device 104 for presenting a view of a message inbox as well as controls for selecting alternate views of the inbox. Upon the user selecting a control for an alternate view, the client computing device 104 sends a request 110 to the message server system 102 for the alternate view. In response, the message server system 102 sends new instructions to the client computing device 104 for presenting the alternate view of the message inbox as well as the controls for selecting other alternate views.

The messages may originate from or have been sent to other systems and devices not shown here. The list of messages, in a section of a view, can include individual messages as well as sets of multiple messages. For example, a set of multiple messages can include a chain or conversation of email correspondence between two or more parties.

In addition to email messages, the messages can include other types of messages. For example, the messages can also include calendar events, voice mail, instant messages, Short Message Service (SMS) texts, Multimedia Messaging Service (MMS) messages, blog posts, and microblog posts or status updates. In some implementations, an inbox can include a mix of multiple types of messages, such as email and calendar events, texts and IM messages, or blog posts and status updates.

In some implementations, the client computing device 104 includes a light weight application, such as a web browser, that processes the instructions 108 from the message server system 102. The instructions 108 can include markup and scripting code, such as HyperText Markup Language (HTML) and JavaScript or other web markup and scripting languages, that define how the messages are presented and actions related to the messages that the user can perform, such as requesting an alternate view.

In some implementations, the client computing device 104 includes a heavy weight application, such as a stand alone email application. The message server system 102 provides the messages to the client computing device 104 and the email application at the client computing device 104 performs the operations of generating instructions for presenting the views of the inbox as well as the controls for selecting alternate views.

Figure 2:
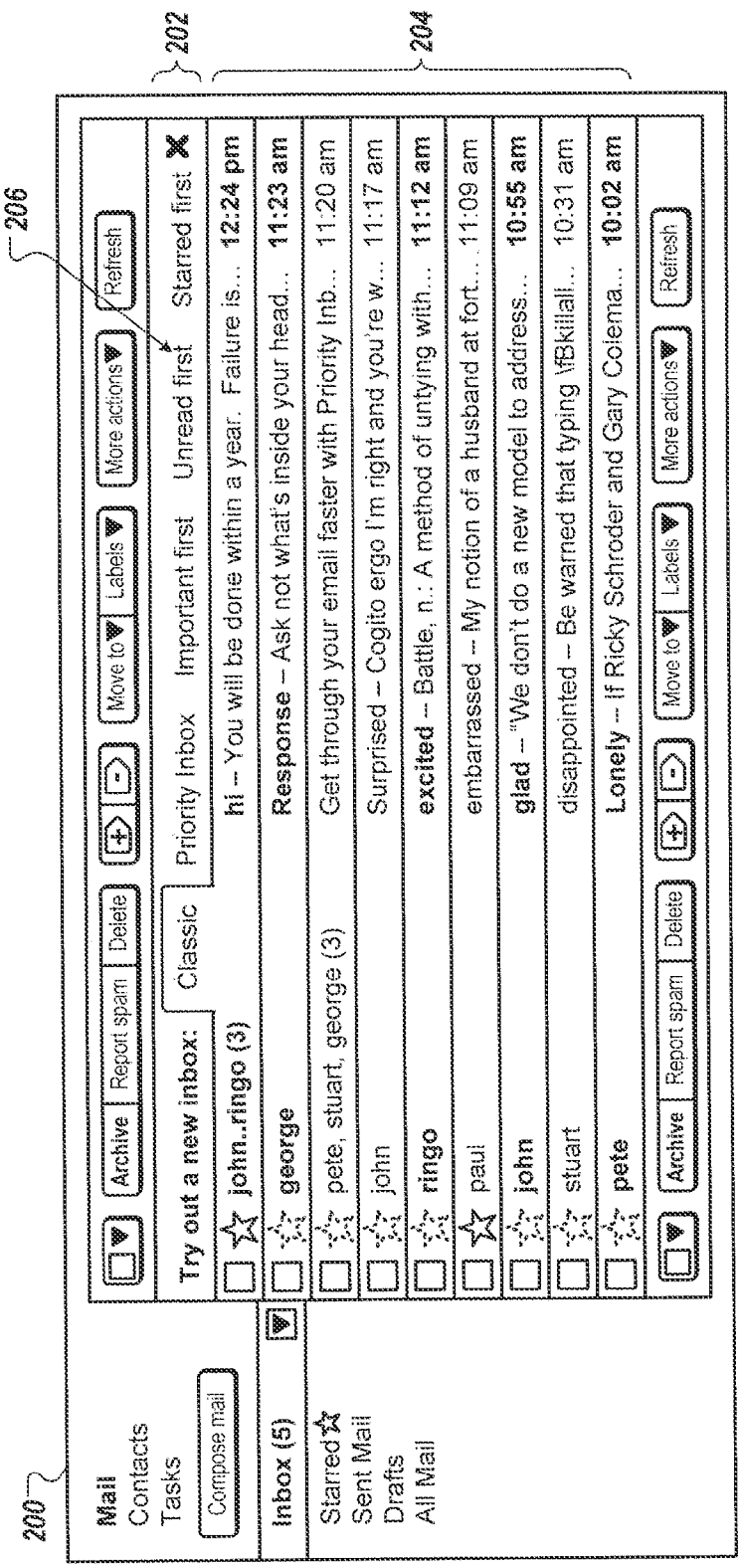
FIGS. 2-6 are examples of graphical user interfaces for organizing a message inbox.

FIG. 2 is an example of a graphical user interface (GUI) 200 that shows multiple selection controls 202 for alternate views of a message inbox. The GUI 200 includes a view 204 of the message inbox. The view 204 presents a list of messages and conversations for one or more email accounts. The view 204 is a classic view that includes a single section that lists messages and conversations chronologically with the most recent at the top of the list. For many email and messaging users, this classic view may be a familiar or comfortable way in which to view messages.

The selection controls 202 prompt the user to try a different or alternate view, such as a priority inbox view, an important first view, an unread view, and a starred view. The selection controls 202 are prominently presented to the user using a tab design. In some implementations, tabs present less of a barrier to user adoption than a configuration setting that is not immediately visible to the user. In addition, a user can easily select a new alternate view or the classic view if a currently selected alternate view is not desired. For example, a user can select an unread first control 206 to request an alternate view that places unread messages in a first section and other messages in a second section.

Figure 3:
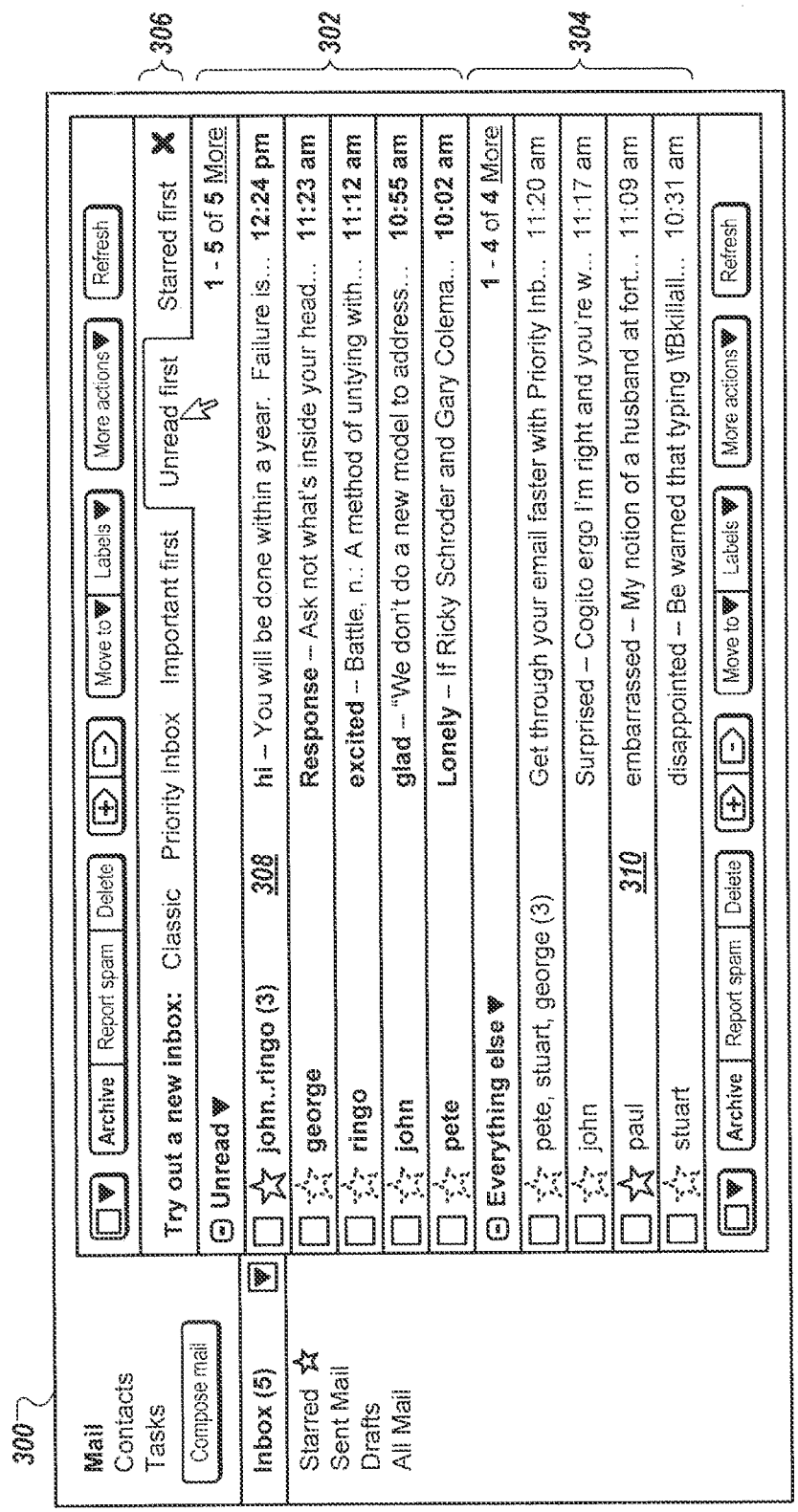

FIG. 3 is an example of a GUI 300 that shows a multi-sectioned alternate view of a message inbox for presenting unread messages in a separate section of the message inbox. The GUI 300 presents unread messages, and conversations that have at least one unread message, in a first section 302. The GUI 300 presents other messages (e.g., read messages and conversations) in a second section 304. Within the first section 302 and the second section 304 the messages and conversation are in chronological order with the most recent messages at the top of the respective section. The GUI 300 includes multiple selection controls 306, including an unread first control that indicates the unread view is currently being used to organize the message inbox.

The selection controls 306 allow the user to request that the GUI 300 be switched to other multi-section alternate views of the message inbox. For example, a user can select the starred first tab control to request that the GUI 300 switch to a starred and not starred multi-section view. Currently, a first message 308 and a second message 310 are starred, as indicated by star controls in the messages. The user can also select a star control to specify that an item in the list be starred or not starred. Upon selection of the control, the client computing device sends a request to the message server system for instructions on presenting the starred first view. The client computing device processes the instructions from the message server system for the starred first view. The instructions place the first message 308 and the second message 310 in a first section for starred items and the remaining messages and conversations in a second section. The GUI 300 presents the messages and conversations within the starred and not starred sections in chronological order with the most recent items at the top of the respective section.

The GUI 300 also allows a user to select the priority inbox tab control to switch to a multi-sectioned view that is based on priority. The priority inbox view may include three sections. The first section may include high priority items, the second section may include starred items, and the third section may include the remaining items. Inclusion in the high priority section may be determined using a number of factors.

The factors for determining whether or not a message from a particular sender is a high priority message can include, for example, a frequency with which users send messages to the sender; an amount of time users spend reading messages from the sender; and whether users delete, archive, or tag messages from the sender. In addition, the GUI 300 can also present controls that allow the user to explicitly increase or decrease the priority of a particular message.

Each of these factors may have a weight or value. The weight or value of each factor for a particular message or conversation can be combined, such as by adding or multiplying, to determine an overall priority for the message or conversation. The messages and conversations that meet some threshold, such as items having a particular priority value and/or a particular number of highest priority items are then presented in the high priority section. The low priority items that are starred are presented in the starred section. The remaining low priority items are presented in the third section.

The GUI 300 also allows a user to select the important first tab control to switch to a multi-sectioned view. The important first view includes two sections. The first section includes high priority items and the second section includes the remaining items. Similarly to the priority inbox, inclusion in the high priority section is determined using a number of factors. The factors for a message from a particular sender can include, for example, a frequency with which users send messages to the sender; an amount of time users spend reading messages from the sender; and whether users delete, archive, or tag messages from the sender. In addition, the GUI 300 can also present controls that allow the user to explicitly increase or decrease the priority of a particular message.

Each of these factors may have a weight or value. The weight or value of each factor for a particular message or conversation can be combined, such as by adding or multiplying, to determine an overall priority for the message or conversation. The messages and conversations that meet some threshold, such as items having a particular priority value and/or a particular number of highest priority items are then presented in the high priority section for the important first view and the remaining items are presented in the second section.

Figure 4:
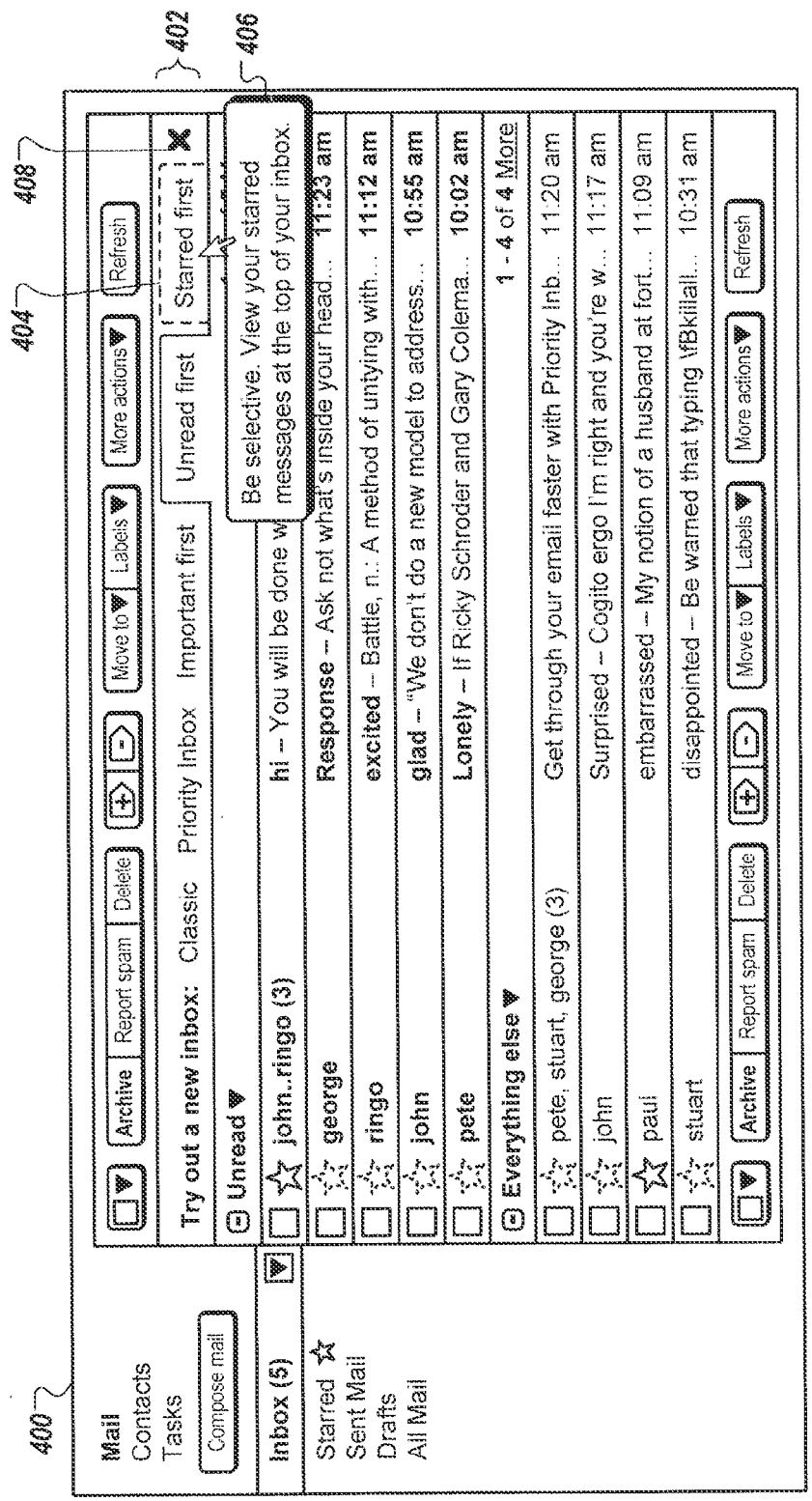

FIG. 4 is an example of a GUI 400 that shows descriptions for alternate views of a message inbox. The GUI 400 includes multiple controls 402 for selecting alternate multi-sectioned views of the inbox. A user can hover a pointing device over a control 404 to see a description 406 of the particular alternate view associated with the control 404. The description 406 may be presented in a pop-up window over the view of the message inbox. In this example, the description 406 indicates that the starred first view presents starred messages and conversations in a section at the top of the view.

Figure 5:
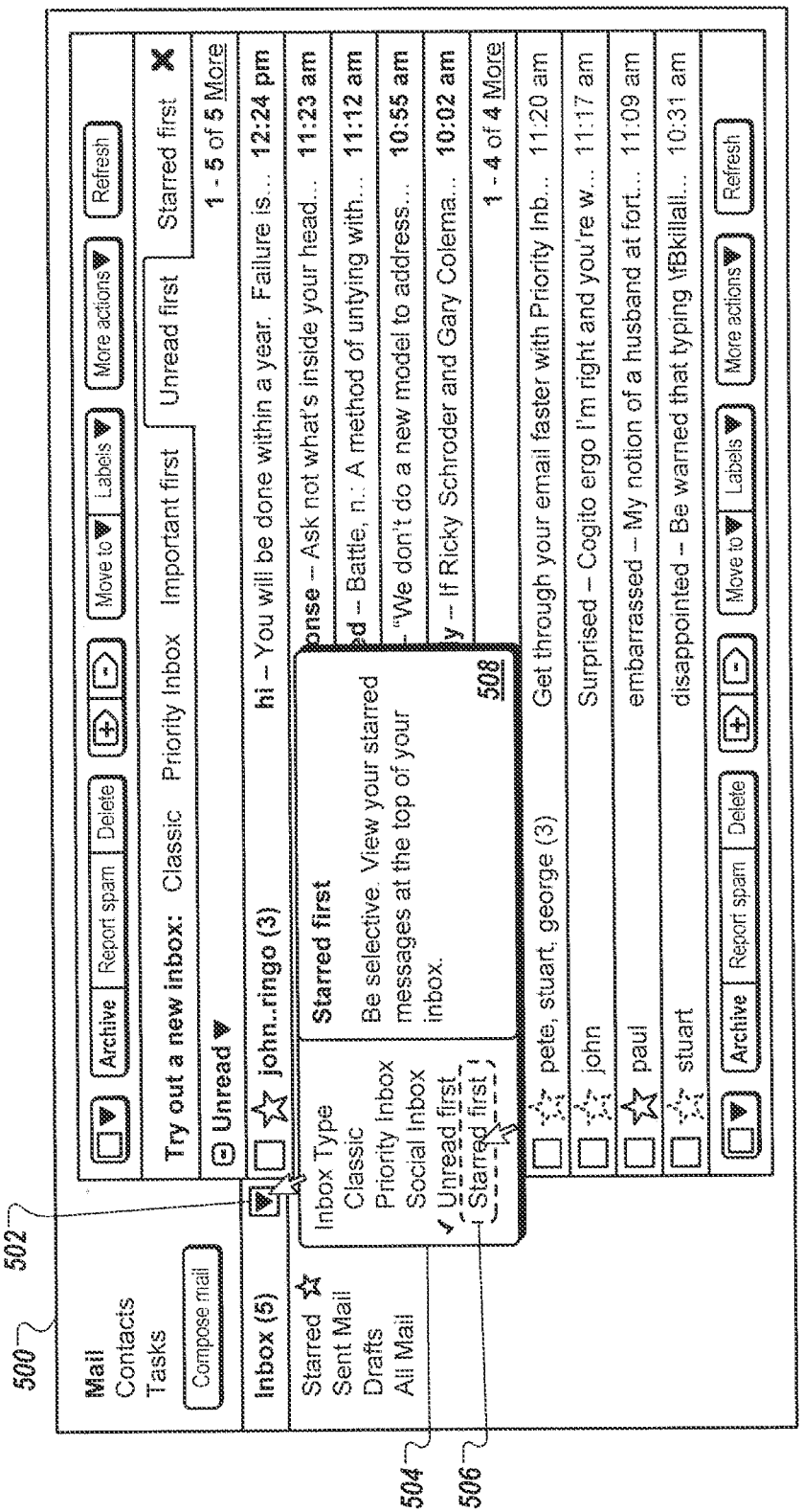

FIG. 5 is an example of a GUI 500 that shows additional selection controls for alternate views of a message inbox. The GUI 500 includes a menu button 502, that when selected by a user, opens an additional control 504 for selecting alternate views. The GUI 500 presents a list of the alternate views on the left side of the additional control 504 and indicates the currently selected view with a check mark. A user can select a view from the left side to make a request that the GUI 500 switch to the selected view. In addition, in response to the user hovering a pointing device over a menu item 506 in the left side, the GUI 500 may present a description 508 of the view for the menu item 506 in the right side of the additional control 504.

Figure 6:
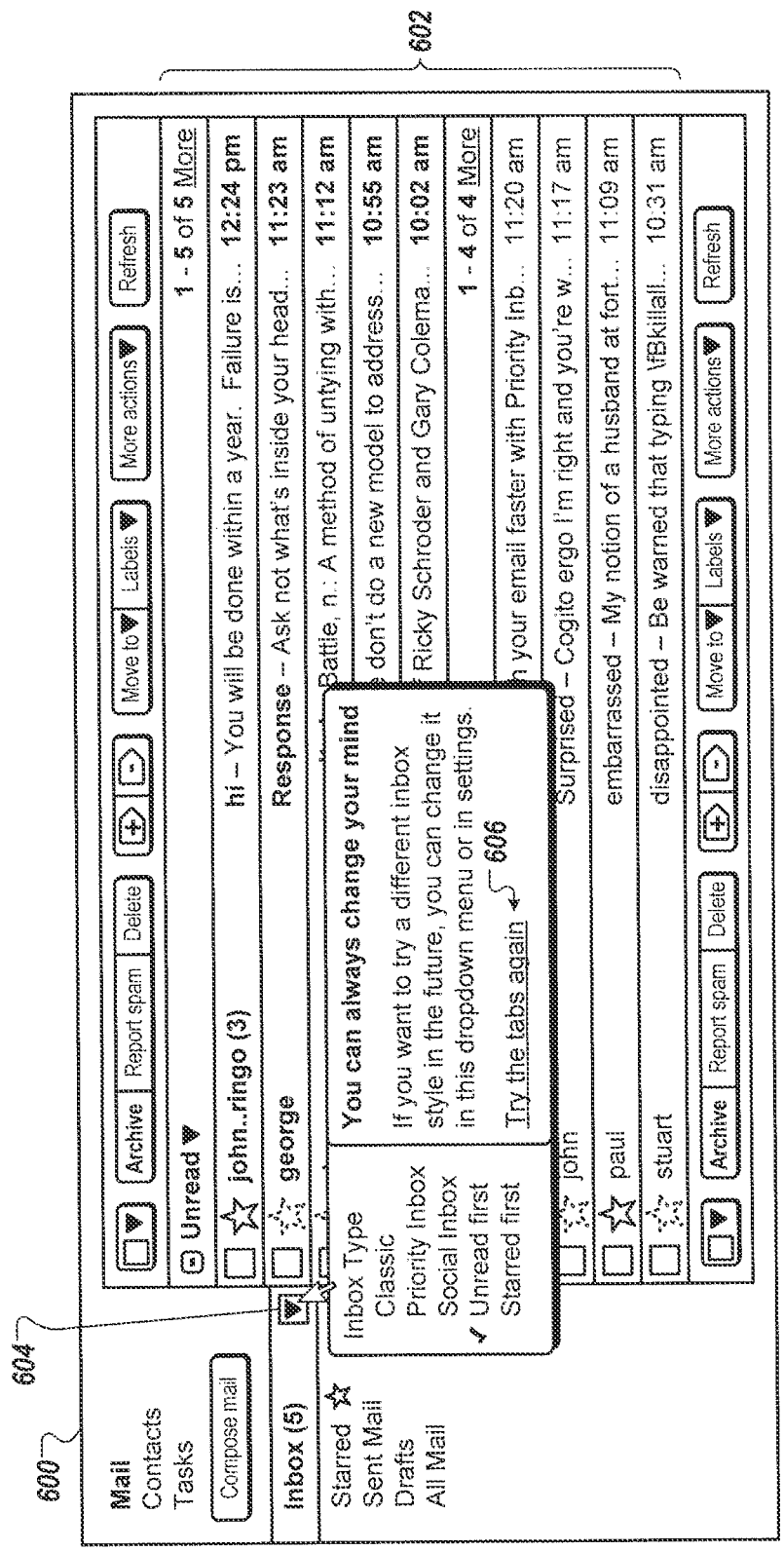

FIG. 6 is an example of a GUI 600 that hides selection controls for alternate views of a message inbox. The GUI 600 includes a multi-sectioned view 602 of a message inbox. The GUI 600 hides or no longer persistently presents controls for selecting alternate multi-sectioned views. The GUI 600 can still present alternate view controls in response to the user selecting a menu button 604.

In some implementations, the GUI 600 no longer presents the persistent selection controls in response to a particular amount of time elapsing, such as one day or one month, from a time at which the persistent selection controls were first presented for the user's message account. In some implementations, the GUI 600 no longer presents the persistent selection controls in response to a particular amount of time elapsing, such as one day or one month, from the last time at which the user selected one of the persistent selection controls. In some implementations, the GUI 600 hides the persistent selection controls after the selection controls have been presented for the user's message account a particular number of times. In some implementations, a GUI, such as the GUI 400, presents a close control 408 that allows the user to manually request that the controls 402 be hidden or closed.

The GUI 600 includes a control 606 that allows the user to request that the GUI 600 return to presenting the persistent view selection controls. In some implementations, the GUI 600 again automatically hides the persistent selection controls after a particular period of time elapses or a number of presentations occurs. In some implementations, the GUI 600 does not subsequent hide the persistent controls again unless a request to hide the persistent controls is received from the user.

Figure 7:
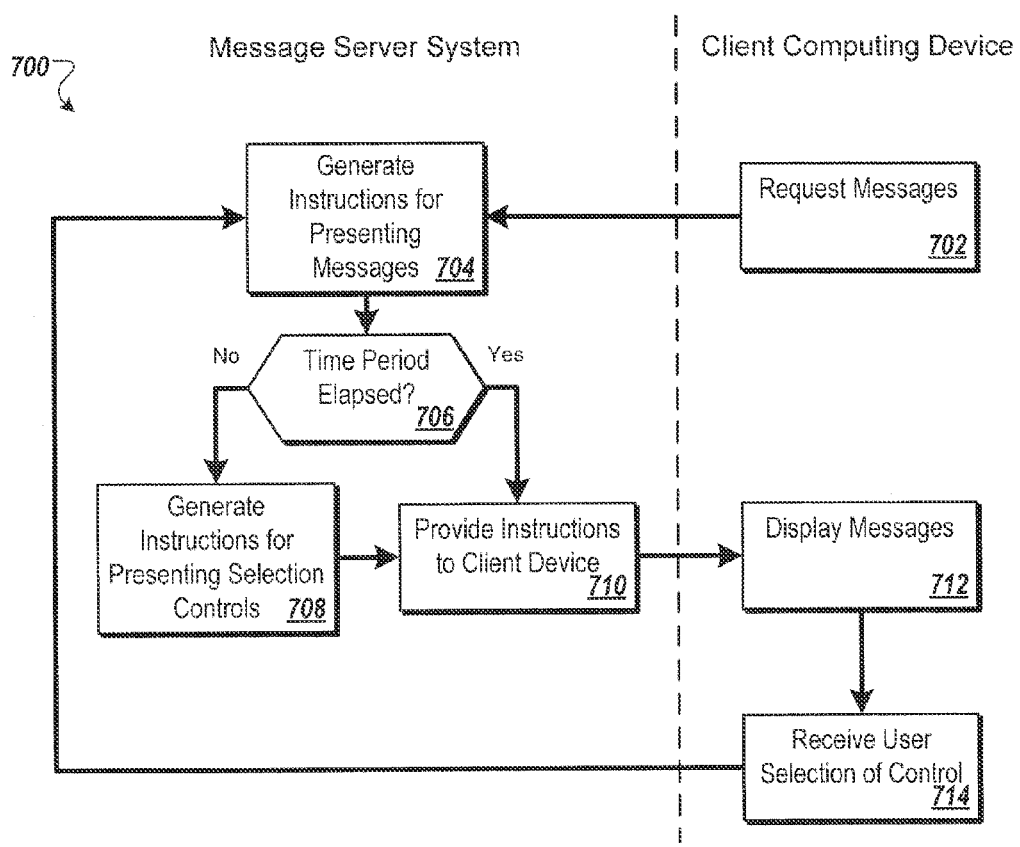
FIG. 7 is flow chart that shows an example of a process for organizing a message inbox.

FIG. 7 is flow chart that shows an example of a process 700 for organizing a message inbox. The process 700 may be performed, for example, by a system such as the system 100. For clarity of presentation, the description that follows uses the system 100 as an example for describing the process 700. However, another system or combination of systems may be used to perform the process 700.

The process 700 begins with sending (702) a request for messages. For example, the client computing device 104 can send a request to the message server system 102 for messages in one or more email accounts for a particular user.

The process 700 generates (704) instructions for presenting a view of the messages. For example, the message server system 102 can send HTML, JavaScript, and other code or data to present a list of email messages and conversations for the user's accounts.

If a time period (e.g., measured from the first presentation of the controls or from the last selection of a control) for presenting selection controls has not yet expired (706), then the process 700 generates (708) instructions for presenting selection controls. The selection controls allow a user to switch to one or more of multiple alternate views that each separate messages into at least two or more sections. For example, the message server system 102 can generate the instructions for the selection controls. In another example, the message server system 102 can generate a set of instructions that allow the client computing device 104 to determine whether or not the time period for presenting selection controls has elapsed, and in response to not having elapsed, the client computing device 104 presents the selection controls.

The process 700 then provides (710) the instructions to a client device. Subsequently, the process 700 displays (712) the messages and the selection controls according to the instructions. For example, the client computing device 104 can receive the instructions 108 from the message server system 102, processes the instructions 108, and as a result presents the view of the inbox and the selection controls.

The process 700 receives (714) a user selection of a selection control. For example, the client computing device 104 can present the GUI 200 to a user and receive a selection of one of the selection controls 202.

The process 700 then repeats the step of generating (704) instructions for presenting a view of the messages. The instructions direct a client device to present the messages in a multi-section view corresponding to the view selected by the user. The process 700 again determines (706) if the time period has elapsed. If the time period has elapsed then the process 700 does not generate instructions for presenting the selection controls. If the time period has not expired, then the process 700 again generates (708) instructions for presenting the selection controls. Alternatively, the client device can use the instructions from the message server system to determine whether or not the time period has elapsed and present selection controls accordingly.

Figure 8:
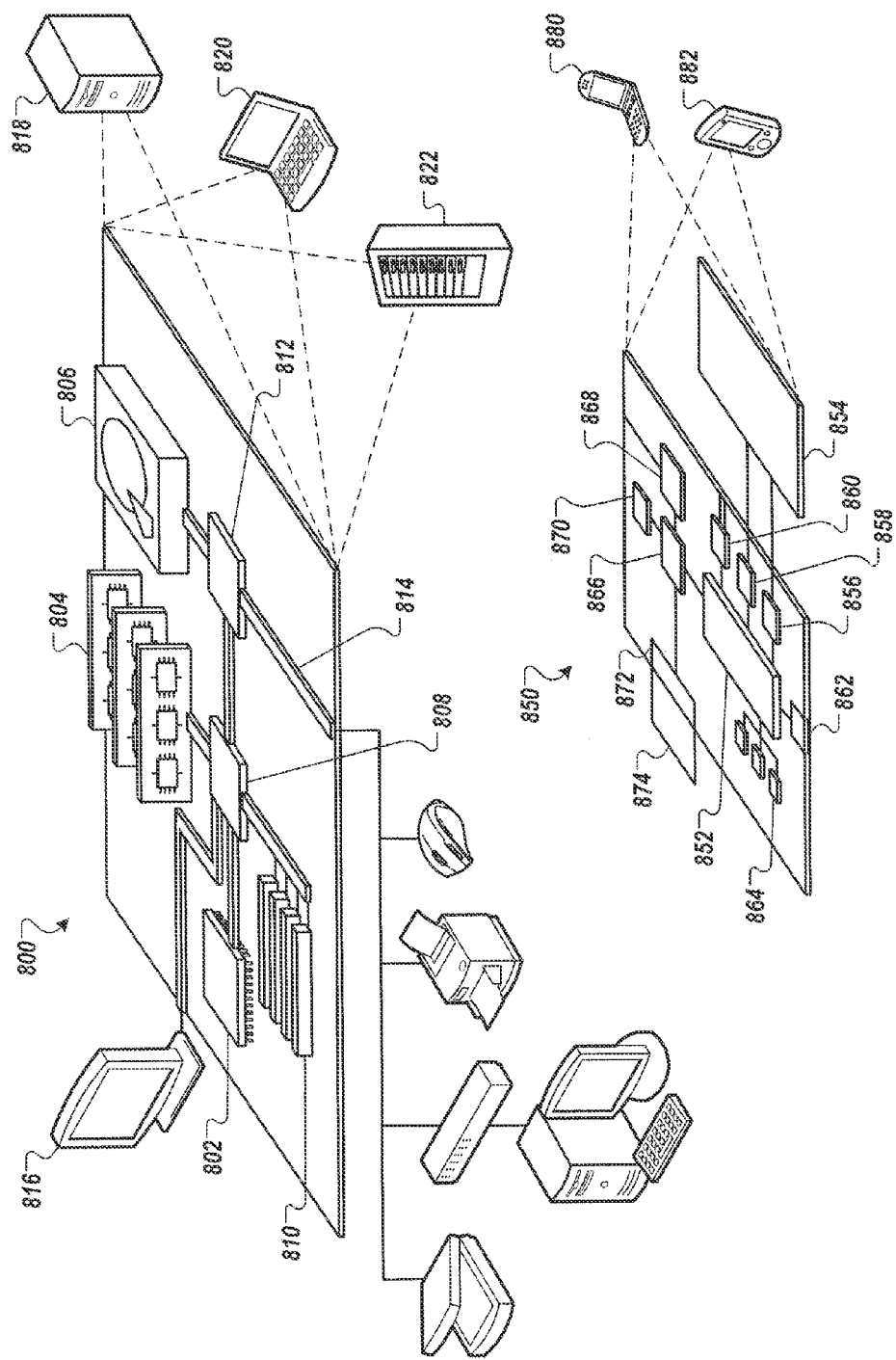
FIG. 8 is a schematic diagram that shows an example of a computing device and a mobile computing device.

FIG. 8 is a schematic diagram that shows an example of a computing device 800 and an example of a mobile computing device that can be used to implement the systems and techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations.

A computer program product can be tangibly embodied in an information carrier. The computer program product may contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 818, or multiple times in a group of such servers. In addition, it may be implemented in a personal computer such as a laptop computer 820. It may also be implemented as part of a rack server system 822. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. The memory 864 may include, for example, flash memory and/or NVRAM memory (non-volatile random access memory).

An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a secure manner.

In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880.

It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   at a computing device having one or more processors and memory storing one or more programs for execution by the one or more processors:
   concurrently displaying in an E-mail application (i) a first view of a message folder that includes a plurality of electronic messages and (ii) two or more persistent user interface selection controls, each indicating a respective alternate view that is available for the message folder, wherein a first user interface selection control corresponds to the displayed first view of the message folder;
   upon receiving user selection of a second user interface selection control distinct from the first user interface selection control, displaying an alternate sectioned view of the message folder that displays the plurality of electronic messages grouped into two or more labeled sections specified by the second user interface selection control; and
   upon occurrence of a predetermined system event, hiding the user interface selection controls.

2. The method of claim 1, wherein the predetermined system event is a predefined time requirement.

3. The method of claim 2, wherein the predefined time requirement specifies a predefined time period since the user interface selection controls were first presented to a user.

4. The method of claim 1, wherein the predetermined system event is a predefined user frequency requirement.

5. The method of claim 4, wherein the predefined user frequency requirement specifies a predefined number of times the user interface selection controls have been presented to a user.

6. A computing system, comprising:
   one or more processors;
   memory; and
   one or more programs, wherein the one or more programs are stored in the memory and configured to be executed by the one or more processors, the one or more programs including instructions for:
   concurrently displaying in an E-mail application (i) a first view of a message folder that includes a plurality of electronic messages and (ii) two or more persistent user interface selection controls, each indicating a respective alternate view that is available for the message folder, wherein a first user interface selection control corresponds to the displayed first view of the message folder;
   upon receiving user selection of a second user interface selection control distinct from the first user interface selection control, displaying an alternate sectioned view of the message folder that displays the plurality of electronic messages grouped into two or more labeled sections specified by the second user interface selection control; and
   upon occurrence of a predetermined system event, hiding the user interface selection controls.

7. The system of claim 6, wherein the predetermined system event is a predefined time requirement.

8. The system of claim 7, wherein the predefined time requirement specifies a predefined time period since the user interface selection controls were first presented to a user.

9. The system of claim 6, wherein the predetermined system event is a predefined user frequency requirement.

10. The system of claim 9, wherein the predefined user frequency requirement specifies a predefined number of times the user interface selection controls have been presented to a user.

11. A non-transitory computer readable storage medium storing one or more programs, the one or more programs comprising instructions, which when executed by a computing system with one or more processors, cause the computing system to execute a method of:

concurrently displaying in an E-mail application (i) a first view of a message folder that includes a plurality of electronic messages and (ii) two or more persistent user interface selection controls, each indicating a respective alternate view that is available for the message folder, wherein a first user interface selection control corresponds to the displayed first view of the message folder;

upon receiving user selection of a second user interface selection control distinct from the first user interface selection control, displaying an alternate sectioned view of the message folder that displays the plurality of electronic messages grouped into two or more labeled sections specified by the second user interface selection control; and upon occurrence of a predetermined system event, hiding the user interface selection controls.

12. The non-transitory computer readable storage medium of claim 11, wherein the predetermined system event is a predefined time requirement.

13. The non-transitory computer readable storage medium of claim 12, wherein the predefined time requirement specifies a predefined time period since the user interface selection controls were first presented to a user.

14. The non-transitory computer readable storage medium of claim 11, wherein the predetermined system event is a predefined user frequency requirement.

15. The non-transitory computer readable storage medium of claim 14, wherein the predefined user frequency requirement specifies a predefined number of times the user interface selection controls have been presented to a user.

* * * * *